(12) United States Patent
Alix et al.

(10) Patent No.: US 9,044,886 B2
(45) Date of Patent: Jun. 2, 2015

(54) CONTROLLED VALVE FITTINGS DEVICE FOR AN INSTALLATION FOR THE BLOW-MOULDING OF CONTAINERS COMPRISING INDIVIDUALLY OPERABLE VALVES

(75) Inventors: Olivier Alix, Octeville sur Mer (FR); Thierry Lambert, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 64 days.

(21) Appl. No.: 14/110,329

(22) PCT Filed: May 2, 2012

(86) PCT No.: PCT/EP2012/057997
§ 371 (c)(1),
(2), (4) Date: Oct. 7, 2013

(87) PCT Pub. No.: WO2012/150247
PCT Pub. Date: Nov. 8, 2012

(65) Prior Publication Data
US 2014/0030372 A1 Jan. 30, 2014

(30) Foreign Application Priority Data
May 3, 2011 (FR) ...................................... 11 53771

(51) Int. Cl.
*B29C 49/42* (2006.01)
*F16K 31/122* (2006.01)
(52) U.S. Cl.
CPC ............. *B29C 49/4289* (2013.01); *B29C 49/42* (2013.01); *F16K 31/122* (2013.01)

(58) Field of Classification Search
CPC ... B29C 49/4289; B29C 49/42; F16K 31/122; F16K 3/184; F16K 3/186
See application file for complete search history.

(56) References Cited

U.S. PATENT DOCUMENTS

| 4,214,860 | A | * | 7/1980 | Kleimenhagen et al. | ...... 425/149 |
| 6,905,326 | B2 | * | 6/2005 | Voth et al. | ...................... 425/529 |
| 7,927,093 | B2 | * | 4/2011 | Leblond et al. | ............... 425/529 |
| 8,574,486 | B2 | * | 11/2013 | Jaksztat et al. | ................ 264/532 |

FOREIGN PATENT DOCUMENTS

| DE | 20 2005 020967 U1 | 12/2006 |
| EP | 1 193 401 A2 | 4/2002 |
| FR | 2 928 197 A1 | 9/2009 |
| GB | 944 615 A | 12/1963 |
| WO | 2006/108382 A1 | 10/2006 |

OTHER PUBLICATIONS

International Search Report, dated Jul. 27, 2012, from corresponding PCT application.

* cited by examiner

*Primary Examiner* — Robert B Davis
(74) *Attorney, Agent, or Firm* — Young & Thompson

(57) ABSTRACT

A controlled valve fittings device (22) for an installation for the blow-molding of containers, includes: a low-pressure first valve (24A) which includes elements (58) for shutting off a low-pressure supply line (32); a high-pressure second valve (24B) which includes elements (58) for shutting off a high-pressure supply line (34); an exhaust third valve (24C) which includes elements (58) for shutting off an exhaust line (52); wherein each valve (24A, 24B, 24C) includes an individual actuator (60) and individual shut-off elements (58) which are controlled by the associated actuator (60) that makes them move between an open position and a shut-off position.

13 Claims, 6 Drawing Sheets

CONTROLLED VALVE FITTINGS DEVICE FOR AN INSTALLATION FOR THE BLOW-MOULDING OF CONTAINERS COMPRISING INDIVIDUALLY OPERABLE VALVES

The invention relates to a controlled valve-fittings device for an installation for the blow-molding of containers.

The invention relates more particularly to a controlled valve-fittings device for an installation for the blow-molding of containers, the device comprising:
- a blowing line which is intended to be connected in a fluid tight manner to a container that is to be blow molded;
- a low-pressure fluid inlet first line which is connected to the blowing line;
- a low-pressure first valve which comprises means for closing off the inlet first line;
- a high-pressure fluid inlet second line which is connected to the blowing line;
- a high-pressure second valve which comprises means for closing off the inlet second line;
- an exhaust third line which is intended to discharge the pressurized fluid that may be contained in the container and which is connected to the blowing line;
- an exhaust third valve which comprises means for closing off the exhaust third line.

An installation for high-volume mass production generally takes the form of a carousel which is provided at its periphery with a plurality of molds. Each mold is intended to take a preheated preform.

Each mold is provided with a blowing nozzle which is able to fill the preform with a pressurized blowing fluid in order to convert this preform into a final container that under the effect of the pressure is made to conform to the imprint of the mold.

In a known blow-molding method, during a pre-blowing first step the preform is first of all filled with a first blowing fluid at low pressure. During this first step, the preform is generally stretched axially using a stretching rod. The low-pressure blowing fluid thus accompanies the stretching of the preform, avoiding any tearing.

Next, during a blow-molding second step, the preform thus stretched is subjected to a fluid at a high pressure which allows the walls of the preform to press closely against the imprint of the mold.

During an exhaust third step, the pressurized fluid contained in the container thus formed is discharged via a silencer.

The low-pressure blowing fluid and the high-pressure blowing fluid both travel through the nozzle. Likewise, the blowing fluid that is to be discharged flows through the nozzle.

In order to allow all these fluids to be passed through the nozzle, it is known practice for the molding installation to be equipped with a controlled valve-fittings device.

Such a valve-fittings device is generally formed of what is known as a "four-way" slide valve. Such a valve comprises a hollow body which has four ports:
- a first port for connection to the nozzle via a blowing line;
- a second port for supplying low-pressure blowing fluid;
- a third port for supplying high-pressure blowing fluid; and
- a fourth port for exhaust which is connected to a source of neutral pressure which is at a pressure lower than that of the control fluid "FP".

The source of neutral pressure is formed, for example, by the atmosphere or by a blowing-fluid recovery device.

A slide is slideably mounted inside the body in order selectively to close off the ports. Such a valve is fitted with a slide that is common to all the ports. The slide has drillings that allow the blow-molding first port to be made to communicate selectively with one of the other ports according to the position of the slide.

The sliding of the slide is for example controlled by a cam that is fixed with respect to the carousel. Thus, the various steps in the blow-molding method are triggered according to the angular position of the carousel.

However, it has been found that such a valve was liable to become worn very rapidly, for example within six months of intensive use. The wear occurs notably between the slide and the body, causing a loss of sealing.

As soon as one of the valve ports can no longer be shut off in a fluid tight manner, the entire slide and/or body has/have to be replaced.

In addition, such a valve is designed specifically for one given model of machine. This means that such elements are manufactured in small quantities, with a corresponding increase in their cost.

The invention proposes a controlled valve-fittings device of the type described hereinabove, characterized in that each valve has an individual actuator and individual shut-off means which can be made to move by said associated actuator between an open position and a shut-off position, each actuator being able to be operated independently of the actuators of the other two valves.

According to other features of the invention:
- the shut-off means of each of the valves are formed of an individual shut-off valve plug which is mounted so that it can slide between a shut-off position in which the valve plug collaborates with a seat to shut off the associated line, and an open position in which the valve plug is away from the seat to allow fluid to pass between said associated line and the blowing line;
- each actuator comprises a piston which is slideably mounted in a cylindrical cavity, the piston being capable of pushing the associated valve plug toward its shut-off position when one pressure chamber of the cylindrical cavity is supplied with a pressurized control fluid, the valve plug being free to be lifted toward its open position when the pressure chamber is subjected to a neutral pressure which is lower than the pressure of the control fluid;
- the three valves have a common body which is provided with a single port for connection to the container, with a port for connection to a low-pressure fluid source, with a port for connection to a high-pressure fluid source and with an exhaust port;
- each valve comprises an individual actuator and an individual valve plug which are mounted on the common body;
- the actuators are operated by operating means which comprise a set of pressure-distributing directional-control valves which are capable selectively of supplying pressurized control fluid to the pressure chamber of each actuator;
- the device comprises three pressure-distributing directional-control valves each of which is associated with an actuator, each directional-control valve having a port for the supply of control fluid, a port for distributing the control fluid to the associated pressure chamber, and a port for returning to a neutral pressure, each pressure-distributing directional-control valve being able to be made to move between an activated position in which the associated pressure chamber is supplied with control fluid and a deactivated position in which the pressurizing chamber is at a neutral pressure;

the operating means are controlled by a cam which is common to all the directional-control valves, the cam allowing each directional-control valve to be controlled selectively in order to operate each valve in succession;

each actuator comprises an electric motor which is able to control the position of the shut-off means;

the actuator is operated using an electromagnetic or electrical signal.

Other features and advantages of the invention will become apparent during the course of a reading of the detailed description which follows, for an understanding of which reference will be made to the attached drawings among which:

Figure 1:
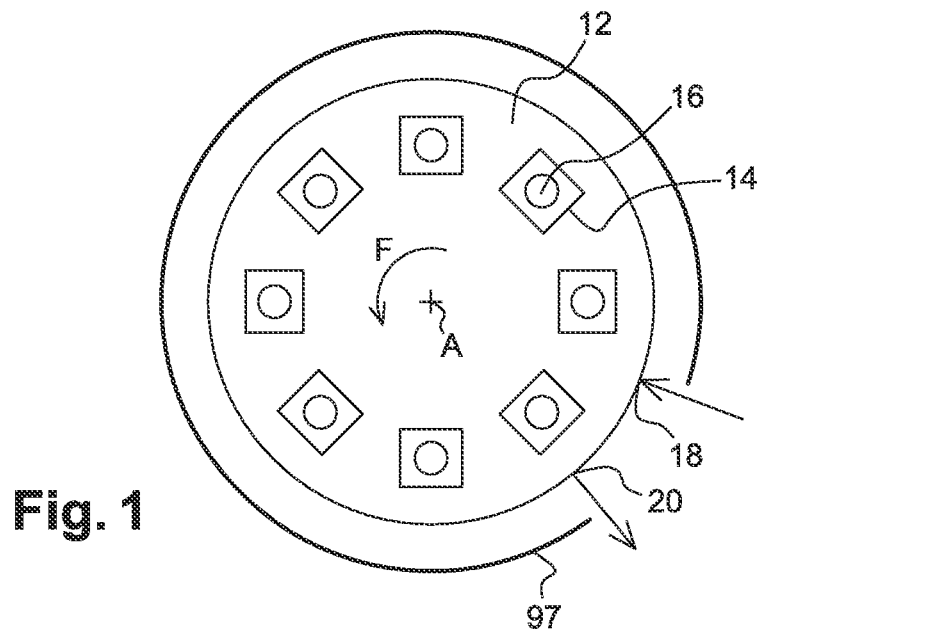
FIG. 1 is a plan view schematically depicting an installation for the blow-molding of containers and comprising blowing nozzles.

The following will be adopted nonlimitingly throughout the remainder of the description:

a longitudinal orientation indicated by the arrow "L" which is directed from the back forward;

vertical orientation indicated by the arrow "V" which is directed from the bottom upward;

and a transverse orientation indicated by the arrow "T" which is directed from left to right.

Hereinafter, elements that perform identical, analogous or similar functions will be denoted by the one same reference numeral.

FIG. 1 depicts a molding installation 10 for a machine (not depicted) for the manufacture of containers, particularly bottles, made of thermoplastic by blow-molding or stretch-blow-molding a preheated preform.

A plastic or thermoplastic material notably means materials such as "PET", which stands for polyethylene terephthalate or alternatively "PEN" which stands for polyethylene naphthalate.

The molding installation 10 depicted in FIG. 1 is, however, merely one nonlimiting exemplary embodiment of the type of molding installation 10 to which mounting means produced according to the teachings of the invention can be applied.

The molding installation 10 illustrated in FIG. 1 comprises a carousel 12 which is mounted such that it can rotate in the counterclockwise direction about a vertical axis "A", as indicated by the arrow "F". Molds 14 are arranged at the periphery of the carousel 12. Each mold 14 is associated with blowing or stretch-blowing means comprising a blowing nozzle 16.

However, the invention can also be implemented in a manufacturing machine of linear (rather than rotary) type.

For further details of an exemplary embodiment of blowing or stretch-blowing means, reference may be made to document FR-A-2 764 544.

When it is operating, the carousel 12 rotates. The molds 14 pass in succession through an insertion point 18 where a preform is inserted into each mold 14. As the carousel 12 turns, said preform is then formed into a container by the stretch-blow-molding means associated with said mold 14. The final container obtained is then discharged from the associated mold 14 as it passes through a discharge point 20 before a new cycle begins.

According to a known method for forming the container, the blow nozzle 16 sits over the opening (the neck) of the preform. Then, during a pre-blowing first step, a pre-blowing fluid is injected, via the nozzle 16, into the preform to inflate it. The pre-blowing is accompanied by a stretching (or elongating) of the preform using a stretch rod (not depicted).

The pre-blowing notably makes it possible to avoid the material clinging to the rod during the stretching. Material contact with the rod would cause localized cooling of the preheated preform.

At the end of the pre-blowing step, a blowing second step is triggered. In this second step, a blowing fluid at a higher pressure is injected, via the nozzle 16, into the preform in order to inflate it and press the material firmly along the walls of the mold 14, making it possible to arrive at the final shape of container.

During a final, exhaust, step which is triggered at the end of the blowing second step, the pressurized fluid contained in the container is discharged via the nozzle 16 before the container is discharged from the mold 14.

The pre-blowing fluid and the blowing fluid are compressible pneumatic fluids.

The pre-blowing fluid will be denoted hereinafter as "low-pressure (LP) fluid". It is generally compressed air at 13 bar.

The blowing fluid will be denoted hereinafter as "high-pressure (HP) fluid". It is generally compressed air at 40 bar.

Figure 2:
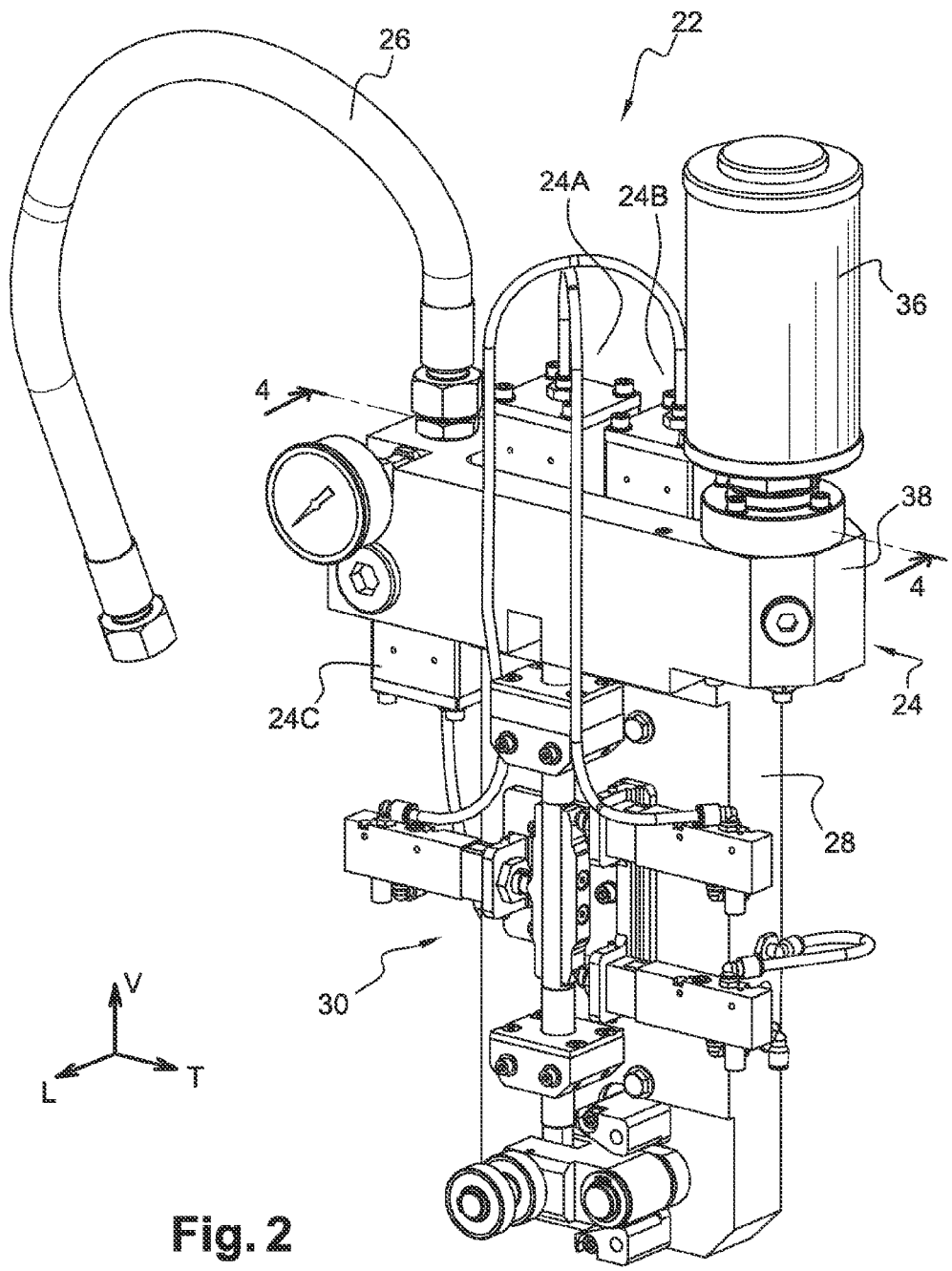
FIG. 2 is a perspective view depicting a controlled valve-fittings device for controlling the passage of fluid through one of the blowing nozzles of the installation of FIG. 1, the device being produced according to a first embodiment of the invention.

As illustrated in FIG. 2, the passage of the various fluids into each nozzle 16 is controlled by a controlled valve-fittings device 22 associated with said nozzle 16. Thus, the molding installation 10 has as many valve-fittings devices 22 as it has nozzles 16. One embodiment of such a device 22 is depicted in FIG. 2.

Figure 3:
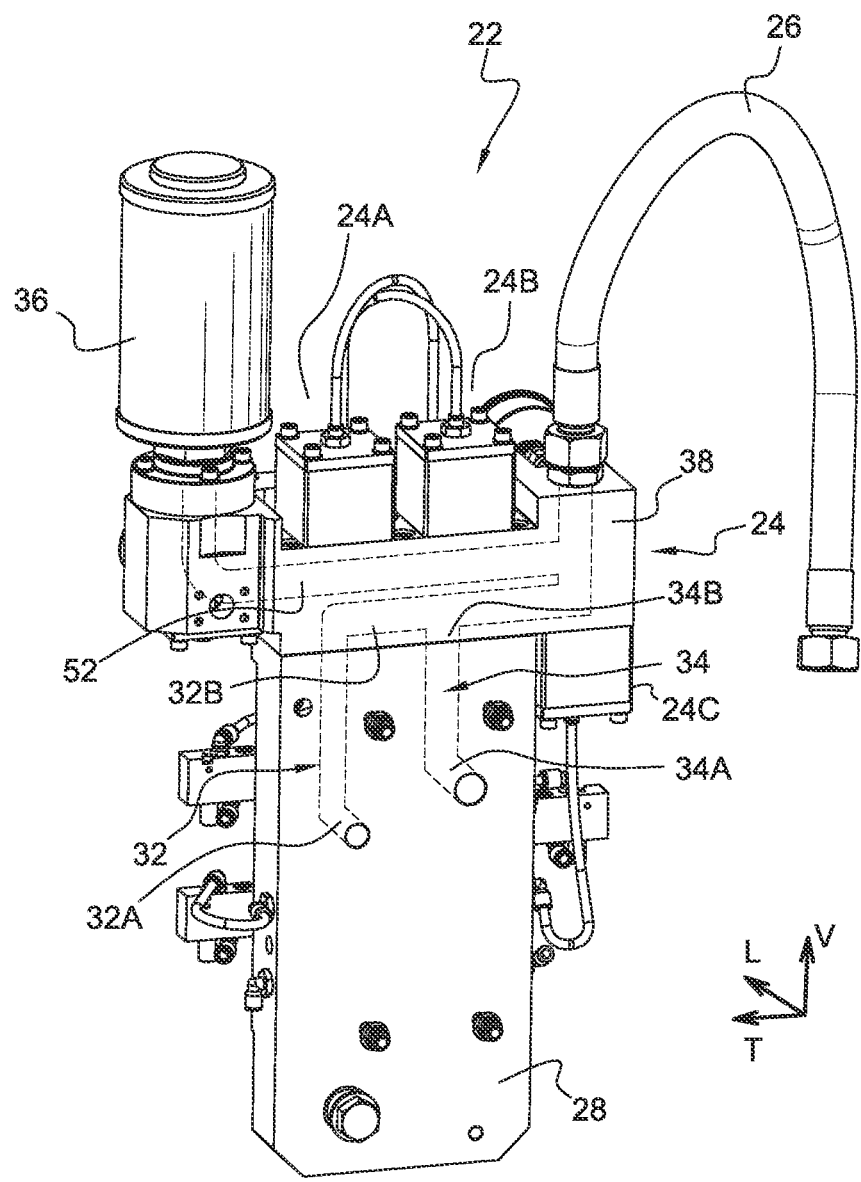
FIG. 3 is a perspective view of the device of FIG. 2 from the opposite point of view to FIG. 2.

The device 22 comprises a blowing line 26 which is intended to be connected to the nozzle 16. As depicted in FIG. 3, in addition to the blowing line 26, the valve-fittings device 22 has a low-pressure (LP) fluid inlet first line 32, a high-pressure (HP) fluid inlet second line 34 and an exhaust line 52 which are connected in parallel to the blowing line 26 via a set 24 of valves.

In the remainder of the description, the first line 32 will be referred to as "low-pressure line 32" and the second line 34 will be referred to as "high-pressure line 34".

The term "parallel" when used to qualify a connection must of course be interpreted in the "connected bypass-wise" sense as opposed to "connected in series".

The set 24 of valves is mounted on the upper face of a mounting plate 28 which is intended to be mounted on the carousel 12. The mounting plate 28 takes the form of a thick transverse vertical panel.

The front face of the mounting plate 28 bears controlled means 30 of operating the valves. These operating means 30 will be described in detail later on.

As depicted in broken line in FIG. 3, a first section 32A of the low-pressure first line 32 is formed within the thickness of the mounting plate 28. The upstream lower end of this first section 32A opens via a port formed in the rear face of the mounting plate 28. The first section 32A extends vertically from the upstream port upward as far as an upper port of the upper face of the mounting plate 28. The upstream end port of the first section 32A is intended to be connected to a source (not depicted) of low pressure "LP" fluid.

A first section 34A of the high-pressure second line 34 is formed in the thickness of the mounting plate 28. The upstream lower end of this first section 34A opens via a port formed in the rear face of the mounting plate 28. The first section 34A extends vertically from the upstream port upward as far as an upper port of the upper face of the mounting plate 28. The upstream end port of the first section 34A is intended to be connected to a source (not depicted) of high-pressure "HP" fluid.

The first section 32A of the low-pressure first line 32 thus runs parallel to the first section 34A of the high-pressure second line 34.

The device 22 also comprises an exhaust silencer 36 which is intended to discharge the pressurized fluid contained in the container at the end of the blowing. To do that, the silencer 36 is connected in parallel to the blowing line 26 via the exhaust line 52.

The set of valves 24 comprises:
a low-pressure first valve 24A which comprises means for shutting off the low-pressure first line 32;
a high-pressure second valve 24B which comprises means for shutting off the high-pressure second line 34;
and an exhaust third valve 24C which comprises means for shutting off the exhaust line 52.

Each valve 24A, 24B, 24C is intended to be made to move between a shut-off position in which the passage of fluid through the associated line 32, 34, 52 is blocked, and an open position in which the fluid flows along the associated line 32, 34, 52. In this instance, the valves 24A, 24B, 24C are not designed to be halted in an intermediate position between the shut-off position and the open position.

Each valve 24A, 24B, 24C comprises a valve body which is provided with a feed port for the associate fluid and with an outlet port for said fluid.

In the example depicted in the figures, the valves comprise a common body 38 which is mounted on the upper face of the mounting plate 28.

Figure 4:
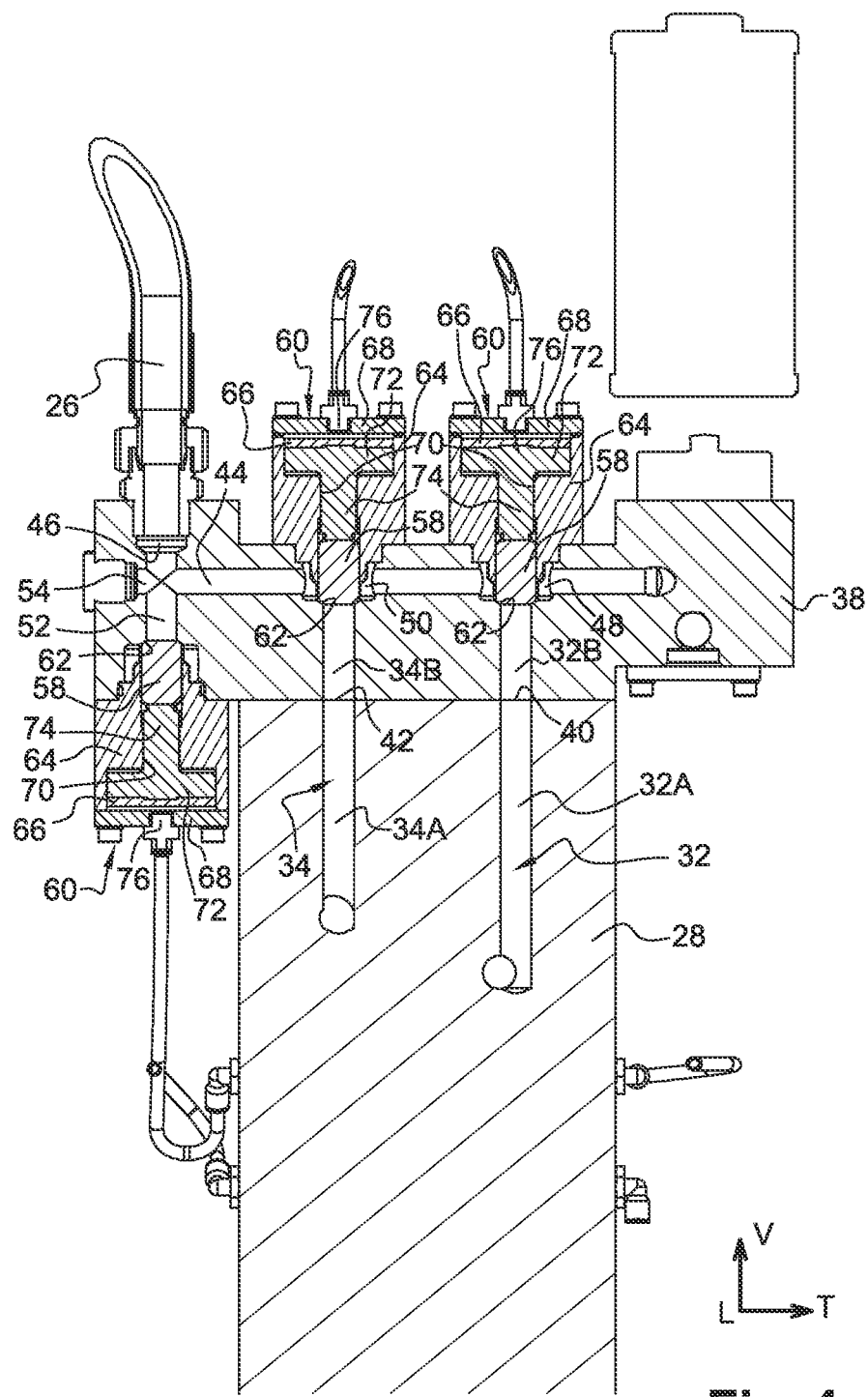
FIG. 4 is a view in section on 4-4 of FIG. 2.

As has been depicted in greater detail in FIG. 4, the body 38 comprises a second section 32B of the low-pressure line 32 which section is intended to be connected to the first section 32A via a low-pressure lower supply port 40. The second section 32B thus extends the first section 32A vertically upward in the valve body 38.

The body 38 also comprises a second section 34B of the high-pressure line 34 which section is intended to be connected to the first section 34A via a high-pressure lower supply port 42. The second section 34B thus extends the first section 34A vertically upward in the valve body 38.

A transverse outlet line 44 is produced in the body 38. This outlet line 44 is connected to the blowing line 26 via an upper outlet port 46. The outlet port 46 is positioned at a first transverse end of the body 38.

The low-pressure line 32 and the high-pressure line 34 are both connected in parallel with the outlet line 44, respectively via a first branch 48 and a second branch 50.

Figure 5:
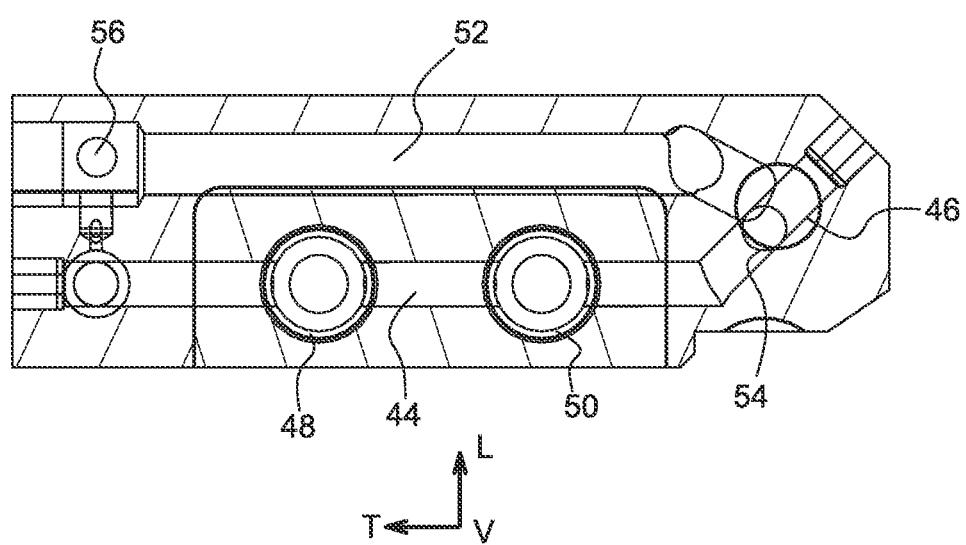
FIG. 5 is a view in section on 5-5 of FIG. 6 depicting the body of all the valves of the device of FIG. 2.

As depicted in FIG. 3 and in greater detail in FIG. 5, the body 38 additionally comprises the exhaust line 52. The exhaust line 52 is connected to the outlet line 44 via a third branch 54 which in this instance is arranged vertically below the outlet port 46. The exhaust line 52 runs transversely and parallel to the outlet line 44. The exhaust line 52 thus extends as far as an exhaust port 56 which is arranged in the upper face of the body 38. The exhaust port 56 is thus positioned at a second transverse end of the body 38. The exhaust port 56 is connected to the silencer 36.

Each valve 24A, 24B, 24C comprises individual shut-off means 58 which can be controlled by an associated actuator 60. Each actuator 60 can be operated independently of the actuators 60 of the other two valves.

The shut-off means 58 and the actuators are identical for each valve 24A, 24B, 24C. They will therefore be described only in respect of a single valve 24A, the same description applying to the other two valves 24B, 24C.

The exhaust valve 24C is positioned under the body 38 whereas the other two valves 24A, 24B are positioned on the body 38. As a result, the description can be applied to the exhaust valve 24C by inverting indications relating to the vertical direction.

As has been illustrated in FIG. 4, the shut-off means 58 are formed by an individual valve plug 58 which is of cylindrical shape and of vertical axis. The valve plug 58 is mounted so that it can slide between a lower shut-off position in which it presses against a complementary seat 62 belonging to the line 32 that is to be shut-off, and an upper open position in which it is away from the seat 62 to allow a fluid to pass through the seat 62. The valve plug 58 here is mounted so that it can slide coaxially with respect to the axis of the associated line 32. In the shut-off position, the valve plug 58 thus collaborates with the seat 62 to shut off the associated line 32.

As far as the low-pressure valve 24A and high pressure valve 24B are concerned, the seat 62 is positioned at the intersection between the associated inlet line 32, 34 and the outlet line 44. In its shut-off position, the valve plug 58 passes across the outlet line 44. In order to prevent the valve from shutting off the outlet line 44 also, the associated branch 48, 50 has a bore section that is greater than the diameter of the valve plug 58. Thus, a passage for fluid is reserved between the valve plug 58 and the edges of the outlet line 44.

The actuator 60 comprises an individual unit 64 which is mounted on an external face of the body 38, opposite the seat 62. The unit 64 has an upper cylindrical cavity 66. The cylindrical cavity 66 is closed off in a fluid tight manner at the top by a cover 68.

The cylindrical cavity 66 is open at the bottom via a vertical cylindrical well 70 that opens toward the bottom. The well 70 has a diameter smaller than that of the cylindrical cavity 66. The well 70 and the cylindrical cavity 66 are coaxial of vertical axis "B".

The body 38 comprises a porthole so that the well 70 of the unit 64 opens into the line 32 that is to be shut off, opposite the seat 62.

The valve plug 58 is guided in sliding by a lower portion of the well 70.

The actuator 60 comprises a piston 72 which is mounted so that it can slide vertically in the cylindrical cavity 66. A fluid tight working chamber is delimited vertically between the piston 72 and the cover 68. The piston 72 is extended downward by a vertical push rod 74 which is slideably mounted in the well 70. The free lower end of the rod 74 is intended to come into contact with the valve plug 58 in order to push it toward its lower shut-off position.

The cover 68 of the actuator 60 is provided with an inlet port 76 for a pressurized control fluid "FP". The pressurized control fluid "FP" is, for example, compressed air at 7 bar.

The control port 76 opens into the working chamber. When the control fluid "FP" is injected into the working chamber, the piston 72 pushes the valve plug 58 toward its shut-off position using the rod 74. The control fluid "FP" is distributed by the operating means 30.

When the working chamber is connected to the source of neutral pressure, for example to the atmosphere, the low-pressure "BP" fluid arriving via the low-pressure line 32 is able to push the valve plug 58 into its open upper position.

Each valve 24A, 24B, 24C can thus be made to move individually between its shut-off position and its open position. The associated valve plug 58 and actuator 60 of a valve can be replaced individually with no modification to the other valves.

Figure 6:
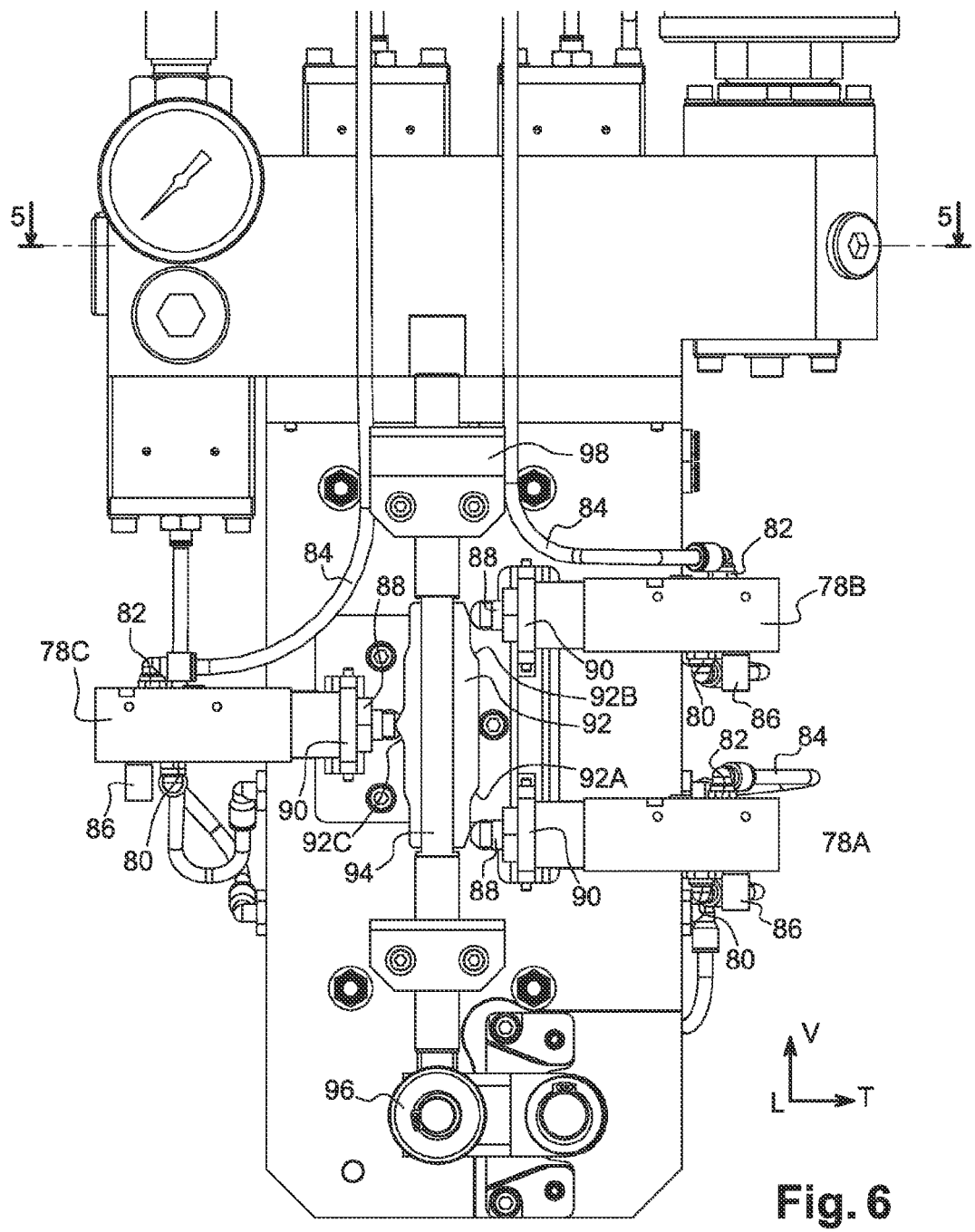
FIG. 6 is a front view depicting, on a larger scale, the means that operate the valves of the device of FIG. 2.

The operating means 30 are depicted in detail in FIG. 6. These operating means 30 comprise a set of pressure-distributing directional-control valves 78A, 78B, 78C which are capable selectively of supplying pressurized control fluid "FP" to the working chamber of each actuator 60.

In the example depicted in the figures, the pressure-distributing directional-control valves 78A, 78B, 78C are of the three-way two-position type. In this case, there are as many pressure-distributing directional-control valves 78A, 78B, 78C as there are valves 24A, 24B, 24C, and each directional-control valve 78A, 78B, 78C is respectively associated with a single valve 24A, 24B, 24C respectively.

The pressure-distributing directional-control valves 78A, 78B, 78C are all identical. Only the pressure-distributing directional-control valve 78A is described hereinafter, the same description applying to the other directional-control valves 78B, 78C.

The pressure-distributing directional-control valve 78A comprises a port 80 for the supply of control fluid "FP" which port is intended to be connected to a source of control fluid "FP". A distribution port 82 is connected to the control port 76 of the actuator 60 of the associated valve 24A via a control line 84. Finally, a discharge port 86 opens directly into the atmosphere.

The directional-control valve 78A is equipped with a slide which is mounted so that it can slide transversely between an activated deployed first position in which the distribution port 82 communicates only with the inlet port 76 and toward which it is elastically returned, and a deactivated retracted second position in which the distribution port 82 communicates only with the discharge port 86. Only a free-end head 88 of the slide is depicted in the figures.

Each pressure-distributing directional-control valve 78A, 78B, 78C is mounted on the front face of the mounting plate 28 by mounting flanges 90. More specifically, the directional-control valves 78A, 78B associated with the valves 28A, 28B are mounted on a right-hand half of the mounting plate 28 in such a way that the head 88 faces transversely toward the center of the front face. The pressure-distributing directional-control valve 78C associated with the valve 28C is mounted on a left-hand half of the mounting plate 28 in such a way that the head 88 faces transversely towards the center of the front face. The pressure-distributing directional-control valves 78A, 78B, 78C are vertically offset from one another.

The directional-control valves 78A, 78B, 78C are made to move selectively into their deactivated second position by a vertically sliding common cam 92. The cam 92 is borne by a bar 94 which is mounted with the ability to slide vertically on the front face of the mounting plate 28. The bar 94 is more specifically arranged transversely at the center of the front face of the mounting plate 28, between the heads 88 of the pressure-distributing directional-control valves 78A, 78B, 78C.

The heads 88 of the directional-control valves 78A, 78B, 78C can thus be pushed in sequence toward their deactivated position by the cam 92. For that, the cam 92 has a first cam way 92A associated with the first directional-control valve 78A, a second cam way 92B associated with the second directional-control valve 78B and a third cam way 92C associated with the third directional-control valve 78C. The cam ways 92A, 92B, 92C are positioned in such a way that two pressure-distributing directional-control valves 78A, 78B, 78C cannot both simultaneously occupy their deactivated position.

The flanges 90 used for mounting the directional-control valves 78A, 78B, 78C advantageously allow the transverse position of each directional-control valve 78 with respect to the cam 92 to be adjusted.

The free lower end of the bar 94 bears a follower 96. The follower 96 is intended to roll along a control cam 97 which is fixed relative to the ground, whereas the device 22 is able to move along a circular or linear path. The control cam 97 controls the vertical sliding of the cam 92 in order selectively to make each pressure-distributing directional-control valve 78 move toward its deactivated position.

The cam 92 is designed so that just one single pressure-distributing directional-control valve 78 is in the deactivated second position whereas the other two pressure-distributing directional-control valves 78 are in the activated first position. The pressure-distributing directional-control valves 78 can thus be made to move one after the other into their deactivated position according to the position of the follower 96 along its path.

Because the control cam 97 is not present over the entire path of the follower 96, the mounting plate 28 is fitted with a brake 98 which is enough to prevent the bar from sliding under the effect of its self-weight.

The operation of the device 22 is now described with reference to the functional diagrams of FIGS. 7A, 7B and 7C.

Figures 7A, 7B, 7C:
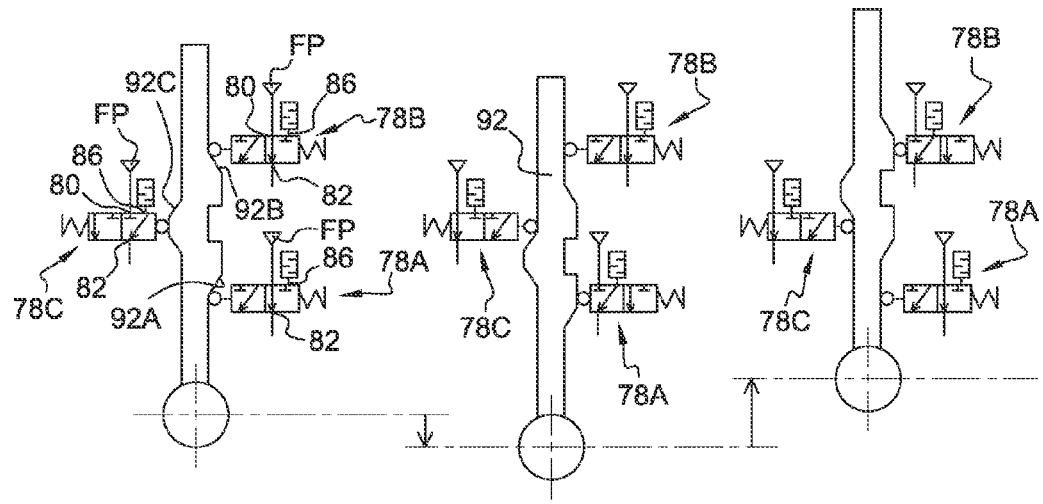
FIGS. 7A, 7B, 7C are diagrams depicting three phases of operation of the means of operating the device of FIG. 2.

When the cam 92 is in an intermediate exhaust first position depicted in FIG. 7A, only the third pressure-distributing directional-control valve 78C is made to move toward its deactivated position. The pressure chamber of the actuator 60 of the exhaust valve 24C is then in communication with the atmosphere. The valve plug 58 of the exhaust valve 24C is thus able to be lifted off its seat 62 by a fluid at a pressure higher than that of the atmosphere.

In this exhaust first position, the actuators 60 of the other two valves 24A, 24B are supplied with pressurized control fluid "FP" by the associated directional-control valves 78A, 78B. The pressure applied to the piston 72 presses the associated valve plug 58 firmly against its seat 62 to shut off the associated line 32, 34. Thus, the pressurized fluid contained in the final container is guided solely toward the exhaust line 52.

The cam 92 is generally kept in this exhaust position by the brake 98 when the molds 14 are rotating empty between the unloading point 20 and the insertion point 18.

FIG. 7B depicts the cam 92 in a pre-blowing lower extreme second position. In this pre-blowing position only the first pressure-distributing directional-control valve 78A is made to move toward its deactivated position. The pressure chamber of the actuator 60 of the low-pressure valve 24A is then in communication with the atmosphere. The low-pressure "LP" fluid is at a pressure sufficiently higher than that of the atmosphere that it can lift the valve plug 58 of the low-pressure valve 24A as it flows from the low-pressure source.

In this pre-blowing second position the actuator 60 of the other two valves 24B, 24C are supplied with pressurized control fluid "FP" by the associated directional-control valves 78B, 78C. The pressure applied to the piston 72 presses the associated valve plug 58 firmly against its seat 62 to shut off the associated line 34, 52. Thus, the low-pressure fluid "LP" is guided only toward the blowing line 26.

For preference, the low-pressure source is operated in such a way as to supply the low-pressure line 32 only after the associated directional-control valve 78A has been made to move into its deactivated position. This notably makes it possible to prevent the valve plug 58 from starting to oscillate vertically under the combined effect of two opposing pressures.

FIG. 7C depicts the cam 92 in a blowing upper extreme third position. In this blowing position, only the second pressure-distributing directional-control valve 78B is made to move into its deactivated position. The pressure chamber of the actuator 60 of the high-pressure valve 24B is then in communication with the atmosphere. The high-pressure "HP" fluid is at a pressure sufficiently higher than that of the atmosphere that it can lift the valve plug 58 of the high-pressure valve 24B as it flows from the low-pressure source.

In this blowing third position, the actuators 60 of the other two valves 24A, 24C are supplied with pressurized control fluid "FP" by the associated directional-control valves 78A, 7C. The pressure applied to the piston 72 presses the associated valve plug 58 firmly against its seat 62 to shut off the associated line 32, 52. Thus, the high-pressure "HP" fluid is guided only toward the blowing line 26.

For preference, the high-pressure source is controlled in such a way as to supply the high-pressure line 34 only after the associated directional-control valve 78B has been made to move into its deactivated position. This notably makes it possible to prevent the valve 58 from starting to oscillate vertically under the combined effect of two opposing pressures.

Figures 8A, 8B, 8C:
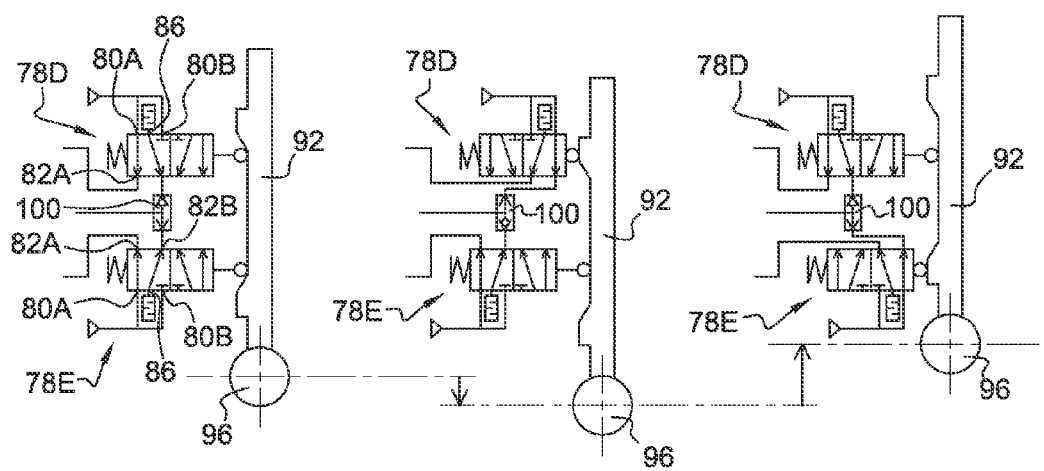
FIGS. 8A, 8B, 8C are views similar to those of FIGS. 7A, 7B, 7C depicting a second embodiment of the means of operating the valves of a valve-fittings device produced according to the teachings of the invention.

FIGS. 8A, 8B, 8C schematically depict a second embodiment of the operating means 30. In this instance, there are just two pressure-distributing directional-control valves 78D, 78E. These are pressure-distributing directional-control valves 78D, 78E of the five-way two-position type.

The first pressure-distributing directional-control valve 78D has two ports 80A, 80B for the supply of control fluid "FP" these ports being intended to be connected to the source of control fluid "FP". A distribution first port 82A is connected to the control port 76 of the actuator 60 of the low-pressure valve 24A via a control line 84. An exhaust second port 82B is connected to the control port 76 of the actuator 60 of the exhaust valve 24C via a non-return check valve 100. Finally, a discharge port 86 opens directly to the atmosphere.

The second pressure-distributing directional-control valve 78E is almost identical to the first. The only difference being that the distribution first port 82A is connected to the control port 76 of the actuator 60 of the high-pressure valve 24B. The exhaust second port 82B is also connected in parallel to the control port 76 of the actuator 60 of the exhaust valve 24C via a non-return check valve 100.

Each directional-control valve 78D, 78E is equipped with a slide which is mounted with the ability to slide transversely between:
- a deployed first position in which the distribution first port 82A communicates with the supply first port 80A and toward which it is elastically returned, and in which the exhaust second port 82B communicates with the discharge port 86;
- and a retracted second position in which the distribution first port 82A communicates with the discharge port 86 and in which the exhaust port 82B communicates with the supply second port 80B.

In this instance the cam 92 is designed so that the two directional-control valves 78D, 78E never simultaneously occupy their retracted positions.

As depicted in FIG. 8A, in the intermediate exhaust position of the cam 92, the two pressure-distributing directional-control valves 78D, 78E simultaneously occupy their deployed position. They thus simultaneously cause the pressure chamber of the actuator 60 of the exhaust valve 24C to communicate with the atmosphere. The valve plug 58 of the exhaust valve 24C is thus able to be lifted off its seat 62 by a fluid at a pressure higher than that of the atmosphere.

In this exhaust first position, the actuators 60 of the other two valves 24A, 24B are supplied with pressurized control fluid "FP" by the directional-control valves 78D, 78E.

In the pre-blowing second position depicted in FIG. 8B, the first pressure-distributing directional-control valve 78D is in its retracted position, whereas the second pressure-distributing directional-control valve 78E is in its deployed position. The pressure chamber of the actuator 60 of the low-pressure valve 24A is then in communication with the atmosphere. The low-pressure "LP" fluid has a pressure sufficiently higher than that of atmosphere to lift the valve plug 58 of the low-pressure valve 24A as it flows from the low-pressure source.

In this pre-blowing second position, the actuator 60 of the high-pressure valve 24B is supplied with pressurized control fluid "FP" by the second directional-control valve 78E while the actuator 60 of the exhaust valve 24C is supplied with pressurized control fluid "FP" by the first pressure-distributing directional-control valve 78D. These two valves 24B, 24C are thus in the shut-off position.

In the blowing third position depicted in FIG. 8C, the second pressure-distributing directional-control valve 78E is in its retracted position whereas the first pressure-distributing directional-control valve 78D is in its deployed position. The pressure chamber of the actuator 60 of the high-pressure valve 24B is therefore in communication with the atmosphere. The high-pressure "HP" fluid is at a pressure sufficiently higher than that of the atmosphere to lift the valve plug 58 of the high-pressure valve 24B as it flows from the high-pressure source.

In this pre-blowing third position, the actuator 60 of the low-pressure valve 24A is supplied with pressurized control fluid "FP" via the first directional-control valve 78D, whereas the exhaust valve 24C is supplied with pressurized control fluid "FP" by the second pressure-distributing directional-control valve 78DE. These two valves 24A, 24C are thus in the shut-off position.

Because the operating means 30 are structurally independent of the set 24 valves, it will be appreciated that other combinations or pressure-distributing directional-control valves and cams can be designed for operating the valves.

In the two embodiments described hereinabove, the actuators 60 are pneumatic cylinders. In an undepicted alterative form of the invention, each actuator comprises an electric motor which can influence the position of the shut-off means. The actuator 60 may then be operated using an electromagnetic or electrical signal.

According to another undepicted alternative form of the invention, it is of course possible to site a blowing fluid recovery valve in addition to the three, low-pressure, high-pressure and exhaust, valves. This recovery valve is then produced in an identical way to the other three valves. Thus, the recovery valve comprises an individual actuator and individual shut-off means. The recovery valve thus makes it possible to cause the exhausted fluid to pass to a pressurized-fluid recovery tank.

The device 22 produced in accordance with one of the two embodiments described hereinabove can easily be adapted to different configurations. Specifically, it is possible to change the associations between the directional-control valves 78A, 78B, 78C and the valves by altering only the connections between the control lines 84.

For example and with reference to FIG. 6, the bottom directional-control valve may be connected to the exhaust valve, the middle directional-control valve may be connected to the pre-blowing valve, the top directional-control valve may be connected to the blowing valve.

For that purpose, the control lines 84 comprise at least certain sections which are made in the form of flexible pipes that can easily be adapted into several configurations. Thus, the same elements can be used for different types of molding installations 10. This standardization of parts thus allows the cost of producing them to be lowered.

The control law governing the directional-control valves 78 may also easily be adapted by changing the shape of the cam 92.

Such a device 22 is also inexpensive to maintain and to repair. This is because when one valve plug or actuator is no longer operating satisfactorily it can be changed individually. This results in a very low cost.

Further, the volume of low-pressure "LP" fluid and the volume of high-pressure "HP" fluid contained in the associated lines is lower by comparison with the solutions of the prior art. Since these are compressible fluids, the saving on volume leads to an energy saving.

The valve-fittings device produced according to the teachings of the invention can be substituted for the valve-fittings device of the prior art without any need to modify the control cams 97 already present in the container-manufacturing machine.

Furthermore, as specified previously, the valve-fittings assembly may include a fourth valve (not depicted) for recovering the blowing fluid. If it does, it is very easy to add a fourth directional-control valve (not depicted) to the support. This directional-control valve is arranged in such a way as to be operated by the same common cam.

The invention claimed is:

1. A controlled valve-fittings device (22) for an installation for the blow-molding of containers, the device (22) comprising:
   a blowing line (26) which is intended to be connected in a fluid tight manner to a container that is to be blow molded;
   a low-pressure fluid inlet first line (32) which is connected to the blowing line;
   a low-pressure first valve (24A) which comprises means (58) for closing off the inlet first line (32);
   a high-pressure fluid inlet second line (34) which is connected to the blowing line (26);
   a high-pressure second valve (24B) which comprises means (58) for closing off the inlet second line (34);
   an exhaust third line (52) which is intended to discharge the pressurized fluid that may be contained in the container and which is connected to the blowing line (26);
   an exhaust third valve (24C) which comprises means (58) for closing off the exhaust third line (52);
   each valve (24A, 24B, 24C) comprises an individual actuator (60) and individual shut-off means (58) which are controlled by said associated actuator (60) in their movement between an open position and a shut-off position, it being possible for each actuator (60) to be operated independently of the actuators (60) of the other two valves;
   control means (30) which operate the individual actuators (60),
   wherein the operating means (30) are controlled by a cam (92) that is common so that each valve (24A, 24B, 24C) is operated in succession.

2. The device (22) as claimed in claim 1, wherein the control means (30) are fixed on a common mounting plate (28), the cam (92) being slideably mounted on said plate (28).

3. The device (22) as claimed in claim 2, wherein the shut-off means of each of the valves (24A, 24B, 24C) are formed of an individual shut-off valve plug (58) which is mounted so that it can slide between a shut-off position in which the valve plug (58) collaborates with a seat (62) to shut off the associated line (32, 34, 52), and an open position in which the valve plug (58) is away from the seat (62) to allow fluid to pass between said associated line (32, 34, 52) and the blowing line (26).

4. The device (22) as claimed in claim 3, wherein each actuator (60) comprises a piston (72) which is slideably mounted in a cylindrical cavity (66), the piston (72) being capable of pushing an associated shut-off valve plug (58) toward its shut-off position when one pressure chamber of the cylindrical cavity (66) is supplied with a pressurized control fluid (FP), the valve plug (58) being free to be lifted toward its open position when the pressure chamber is subjected to a neutral pressure which is lower than the pressure of the control fluid.

5. The device as claimed in claim 4, wherein the operating means (30) comprise a set of pressure-distributing directional-control valves (78A, 78B, 78C, 78D, 78E) which are capable selectively of supplying pressurized control fluid (FC) to the pressure chamber of each actuator (60).

6. The device (22) as claimed in claim 5, wherein each pressure-distributing directional-control valve (78A, 78B, 78C, 78D, 78E) is capable selectively of supplying control fluid (FC) to the pressure chamber of at least one actuator (60) via a flexible control line (84).

7. The device (22) as claimed in claim 5, wherein each directional-control valve (78A, 78B, 78C, 78D, 78E) is fixed on the mounting plate (28) via a mounting flange (90) that allows the position of each directional-control valve (78A, 78B, 78C, 78D, 78E) with respect to the common cam (92) to be adjusted.

8. The device (22) as claimed in claim 5, further comprising at least three pressure-distributing directional-control valves (78A, 78B, 78C) each of which is associated with an actuator (60), each directional-control valve (78A, 78B, 78C) having a port (80) for the supply of control fluid (FP), a port (82) for distributing the control fluid (FP) to the associated pressure chamber, and a port (86) for returning to a neutral pressure, each pressure-distributing directional-control valve (78A, 78B, 78C) being able to be made to move between an activated position in which the associated pressure chamber is supplied with control fluid and a deactivated position in which the pressurizing chamber is at a neutral pressure.

9. The device (22) as claimed in claim 8, wherein the common cam (92) allows each directional-control valve (78A, 78B, 78C) to be controlled selectively in order to operate each valve (24A, 24B, 24C) in succession.

10. The device (22) as claimed in claim 2, wherein the three valves (24A, 24B, 24C) have a common body (38) which is provided with a single port (46) for connection to the container, with a port (40) for connection to a low-pressure fluid source, with a port (42) for connection to a high-pressure fluid source and with an exhaust port (56), each individual actuator (60) and each individual valve plug (58) being mounted on the common body (38).

11. The device (22) as claimed in claim 10, wherein the body (38) is mounted on the mounting plate (28).

12. The device (22) as claimed in claim 1, wherein the shut-off means of each of the valves (24A, 24B, 24C) are formed of an individual shut-off valve plug (58) which is mounted so that it can slide between a shut-off position in which the valve plug (58) collaborates with a seat (62) to shut off the associated line (32, 34, 52), and an open position in which the valve plug (58) is away from the seat (62) to allow fluid to pass between said associated line (32, 34, 52) and the blowing line (26).

13. The device (22) as claimed in claim 1, wherein the three valves (24A, 24B, 24C) have a common body (38) which is provided with a single port (46) for connection to the container, with a port (40) for connection to a low-pressure fluid source, with a port (42) for connection to a high-pressure fluid source and with an exhaust port (56), each individual actuator (60) and each individual valve plug (58) being mounted on the common body (38).

\* \* \* \* \*